(12) United States Patent
Nakamura et al.

(10) Patent No.: US 7,191,294 B2
(45) Date of Patent: Mar. 13, 2007

(54) METHOD FOR SYNCHRONIZING PROCESSORS IN A MULTIPROCESSOR SYSTEM

(75) Inventors: Tomohiro Nakamura, Hachioji (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 10/894,064

(22) Filed: Jul. 20, 2004

(65) Prior Publication Data
US 2005/0050374 A1  Mar. 3, 2005

(30) Foreign Application Priority Data
Aug. 25, 2003  (JP)  ............................. 2003-300510

(51) Int. Cl.
*G06F 12/00* (2006.01)
(52) U.S. Cl. ....................................... 711/147; 713/375
(58) Field of Classification Search ................ 711/147, 711/167, 168; 713/375
See application file for complete search history.

(56) References Cited

FOREIGN PATENT DOCUMENTS

JP          9-305546        11/1997

OTHER PUBLICATIONS

"Computer Organization & Design: The Hardware/Software Interface" by David A. Paterson et al. pp. 559-561, published by Nikkei BP, Apr. 1996.

*Primary Examiner*—Hiep T. Nguyen
(74) *Attorney, Agent, or Firm*—Antonelli, Terry, Stout and Kraus, LLP.

(57) ABSTRACT

The high-speed barrier synchronization is completed among multiprocessors by saving overhead for parallel process without addition of a particular hardware mechanism. That is, the barrier synchronization process is performed by allocating the synchronization flag area, on the shared memory, indicating the synchronization point where the execution of each processor for completing the barrier synchronization is completed, updating the synchronization flag area with the software in accordance with the executing condition, and comparing, with each processor, the synchronization flag area of the other processors which takes part in the barrier synchronization.

6 Claims, 7 Drawing Sheets

FIG.7

EXAMPLE OF SEQUENCE FOR EXECUTION COUNT OF BARRIER SYNCHRONIZATION — 50

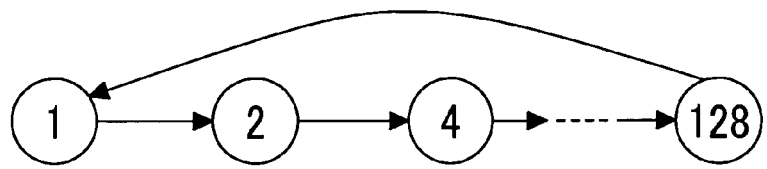

CHECK THE VALUE OF SYNCHRONIZATION FLAG FOR THE OTHER CPU IS THE VALUE EQUAL TO THE VALUE OF THE PRESENT OR THE NEXT BARRIER POINT? 9

51

$$\begin{pmatrix} \text{VALUE OF THE SYNCHRONIZATION} \\ \text{FLAG FOR OWN CPU} \end{pmatrix} = \begin{pmatrix} \text{VALUE OF THE SYNCHRONIZATION} \\ \text{FLAG FOR THE OTHER CPU} \end{pmatrix}$$

OR $$\begin{pmatrix} \text{1 BIT LEFT-ROTATION OF THE VALUE OF} \\ \text{SYNCHRONIZATION FLAG FOR OWN CPU} \end{pmatrix} = \begin{pmatrix} \text{VALUE OF THE SYNCHRONIZATION} \\ \text{FLAG FOR THE OTHER CPU} \end{pmatrix}$$

※ *THE VALUE OF THE SYNCHRONIZATION FLAG IS HANDLED AS 8 BIT DATA*

METHOD FOR SYNCHRONIZING PROCESSORS IN A MULTIPROCESSOR SYSTEM

CLAIM OF PRIORITY

The present application claims priority from Japanese application JP 2003-300510 filed on Aug. 25, 2003, the content of which is hereby incorporated by reference into this application.

FIELD OF THE INVENTION

The present invention relates to a multiprocessor system, and particularly to barrier synchronization process in a shared memory multiprocessor system and a method of controlling a computer for realizing barrier synchronization with an easier program code without necessity of exclusive hardware.

BACKGROUND OF THE INVENTION

Upon execution of parallel programs, barrier synchronization is required among processors in the shared memory multiprocessor system in which processors share the memory.

In the prior art, the process called lock procedure has been executed in order to maintain coherence for such barrier synchronization.

This process is intended to execute the exclusive access control for data and enables a plurality of processors to exclusively read variables called the lock variables. Moreover, in accordance with the state of these lock variables, completion or incompletion of the barrier synchronization has been determined. However, in order to realize such exclusive read and write operations, it is required to execute an instruction which requires a longer processing time such as the test and set instruction being prepared in the processor. In addition, such exclusive process has disadvantage that the processing time remarkably increases as the number of processors for executing the barrier synchronization increases.

The method of barrier synchronization using lock variables is described on the pages 559–561 of the non-patent document, "COMPUTER ORGANIZATION & DESIGN: THE HARDWARE/SOFTWARE INTERFACE" (by David A. Paterson/John L. Hennessy, translated by Mitsuaki Narita, published by Nikkei B P, April 1996).

Moreover, in an example of the method, a local memory is provided in each processor, a counter is stored in a shared memory of each processor, and each processor is capable of setting synchronization with this counter (patent document 1). In this method, a processor is defined as a master processor and the other processors are defined as slave processors and the master and slave processors are synchronized on the basis of values of the counter on the shared memory.

[Patent Document 1]

JP-A No. 305546/1997

The barrier synchronization process among the multiprocessors through exclusive control by lock process in the former prior art requires a longer time.

Particularly, when the barrier synchronization is often required, efficiency of parallel process will be remarkably lowered due to the influence of lock process and in some cases, high-speed process cannot be realized because of the serial execution.

A reason of such phenomenon may be concluded to rise of the problem that the lock process is always conducted as the data read and write process on the main memory and a longer time is required for execution of one test-and-set instruction.

Moreover, the former prior art also has a problem that memory access performance is lowered because the data read and write operations resulting from the lock process are conducted for only one address on the main memory.

In addition, the latter prior art has a problem that, although one processor is defined as the master processor and the other processors are defined as the slave processors and thereby synchronization between these processors can be ensured, synchronization cannot be assured among the slave processors because the counter of shared memory is utilized only for synchronization between the master processor and the slave processors, and high-speed operation cannot be realized when this method is adapted to the parallel process.

SUMMARY OF THE INVENTION

The present invention has been proposed for solving the problems described above and an object of the present invention is, therefore, to provide a method of realizing the high-speed barrier synchronization among multiprocessors without execution of a process which requires a longer time just like the lock process and without addition of particular hardware mechanism.

The present invention can realize the barrier synchronization process by allocating, on the shared memory, a synchronization flag area (counter) indicating a synchronization point in which execution of each processor has been completed for the barrier synchronization, updating this synchronization flag area with a software in accordance with an executing condition, and comparing, in each processor, the synchronization flag areas of the other processors which take part in the barrier synchronization.

The synchronization flag is updated when each processor reaches the synchronization point and each processor determines setting of barrier synchronization depending on whether the synchronization flags of the other processors are completely matched with own synchronization flag or with the synchronization flag when such processor has reached the next synchronization point or not.

Moreover, the high-speed barrier synchronization process can be realized because it is enough for each cache line to be flashed once for each synchronization without flash of cache of each processor for each update of the synchronization flag by allocating the synchronization flags of one processor for each cache line defined as the unit of cache coherence management using the cache memories mounted to the shared memory.

Accordingly, the present invention can provide following effects for the synchronization process among multiprocessors in order to economically improve the parallel processing performance in the multiprocessor system.

First, the barrier synchronization process can be realized in various scales with the software without use of particular hardware.

Second, high-speed barrier synchronization process can be realized through optimization considering cache structure.

Realization of the barrier synchronization processes in various scales described above means that necessary number of areas can be attained because the synchronization flag areas are provided on the main memory, for example, even when the number of processors which take part in the barrier synchronization increases remarkably. Moreover, such process can also be realized, even in the more practical barrier synchronization process, by increasing, as required, the number of times of check of the synchronization flag with the other processors through the control on the basis of the software.

Moreover, the optimization considering the cache structure means, for example, another cache line system and the high-speed barrier synchronization process can be realized by adjusting the software in accordance with the system structure in unit of the cache and coherence control.

BRIEF DESCRIPTION OF THE DRAWINGS

FIG. 7 is an explanatory diagram illustrating an example of the values updated in the barrier synchronization process.

DETAILED DESCRIPTION OF THE PREFERRED EMBODIMENTS

The preferred embodiments of the present invention will be described with reference to the accompanying drawings.

Figure 1:
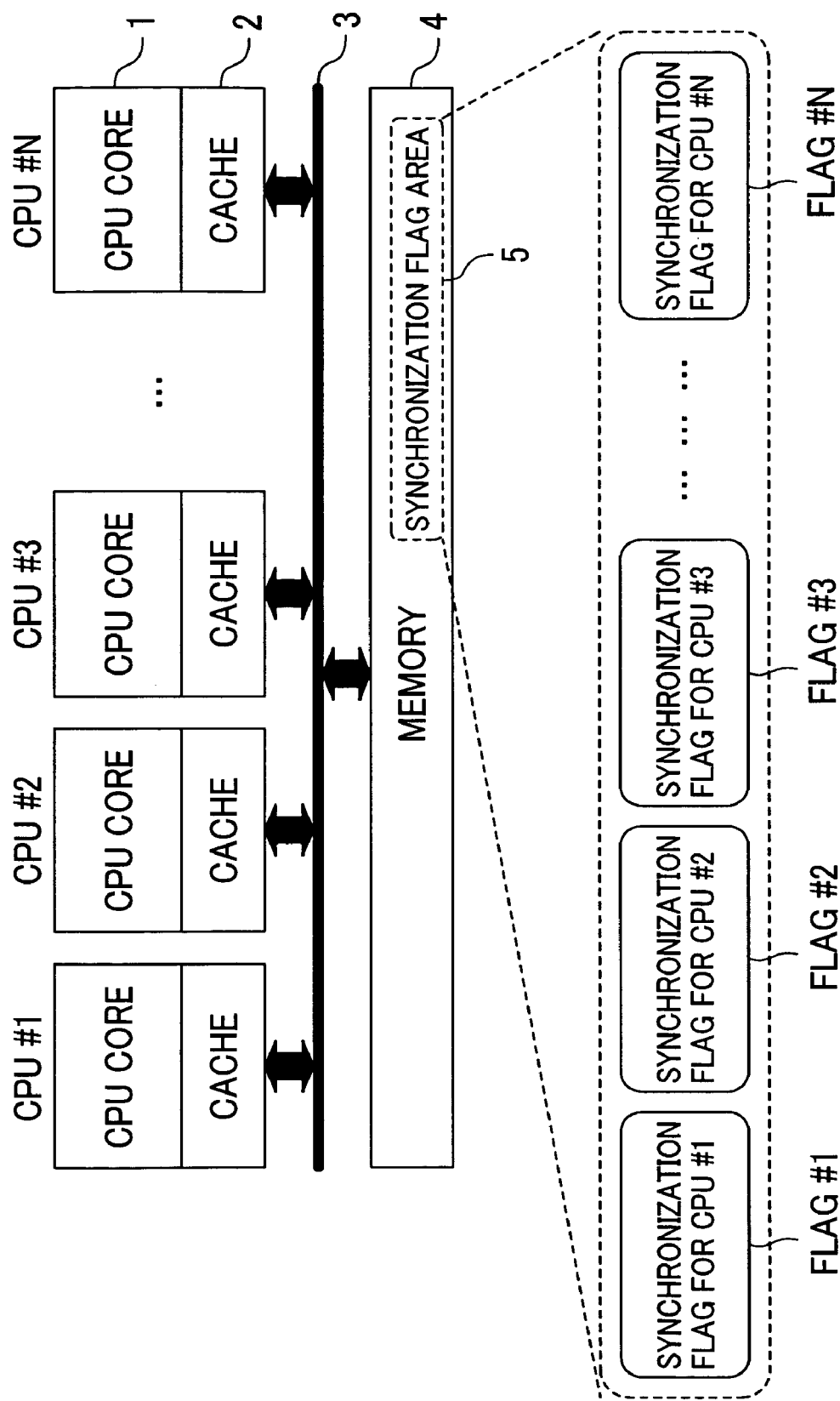
FIG. 1 is a structural diagram illustrating a multiprocessor system for the barrier synchronization process as a preferred embodiment of the present invention.

FIG. 1 illustrates a shared memory multiprocessor system to which the present invention is adapted.

In FIG. 1, a plurality of processors (CPU cores in the figure) are respectively provided with a cache memory 2. Moreover, the system comprises a common bus 3 for connecting each processor 1 with a memory (main memory) 4 and the main memory 4 which is used in common by a plurality of processors. In this case, the processor 1 is formed of CPU#1 to CPU#N.

In this embodiment, a partial area of the main memory 4 is defined as a synchronization flag area 5 used for barrier synchronization. The synchronization flag area 5 may be allocated to the desired area in the main memory 4 and therefore it is not required to prepare for the particular area for this synchronization flag area. Moreover, an area for barrier synchronization (battier point or timing) has been previously set within the program executed by the multiprocessor system.

In the synchronization flag area 5, the synchronization flags (FLAG#1 to FLAG#N) are prepared as the exclusive counters for each processor (CPU#1 to CPU#N) and the synchronization flags FLAG#1 to #N are respectively updated with the predetermined arithmetic operations such as addition whenever each processor 1 completes the barrier synchronization.

Since the synchronization flag area 5 is allocated to an area on the ordinary main memory 4, it is cached in some cases to the cache memory 2 of the CPU 1. In this case, a mechanism for keeping coherence of the cache memory 2 is required.

Figure 2:
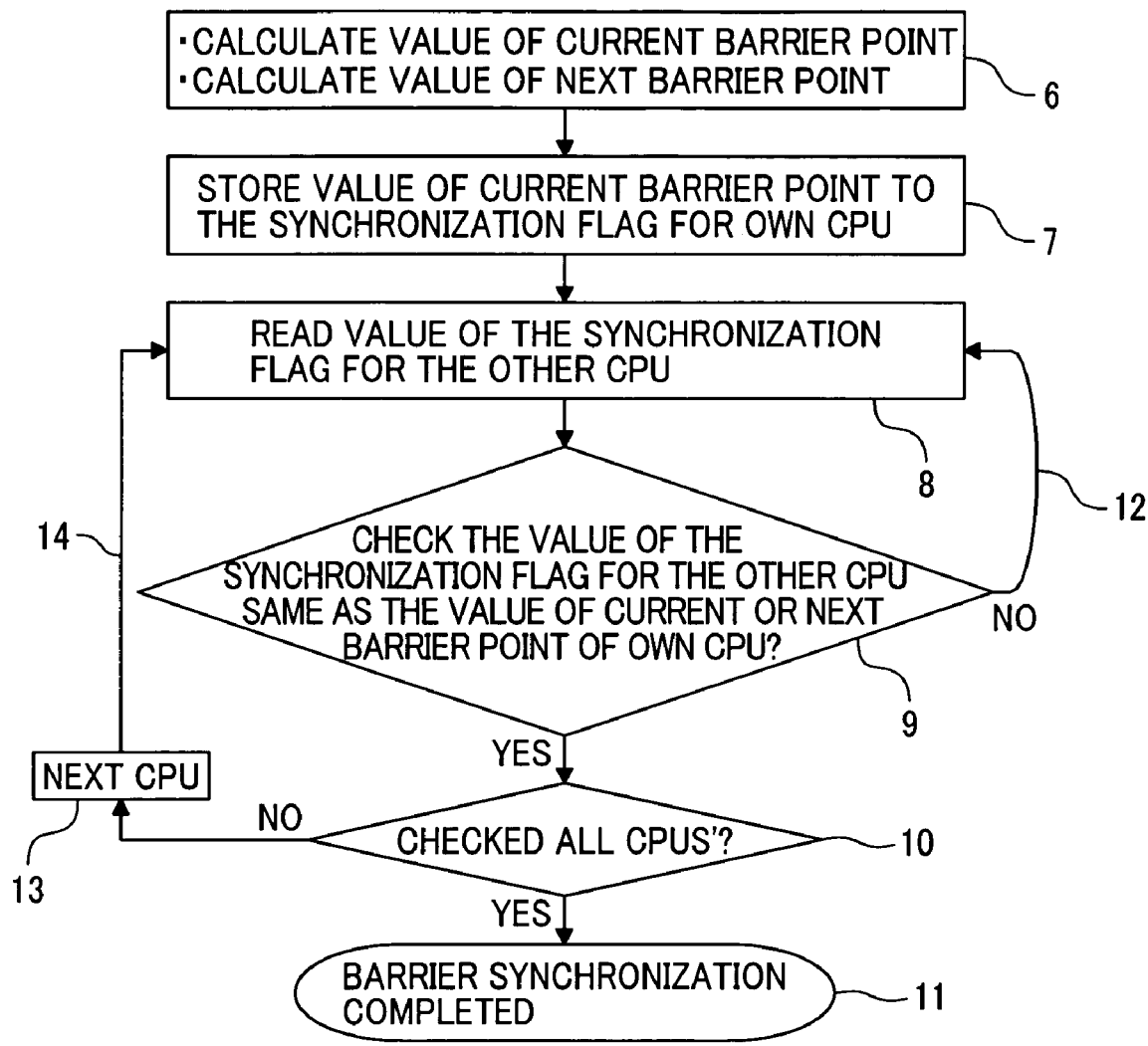
FIG. 2 is a flow chart of an example of the barrier synchronization process.

FIG. 2 illustrates a flowchart of the barrier synchronization process by the present invention.

Each processor 1 calculates, when it reaches the barrier synchronization point in the program code, the value corresponding to the present barrier point and the value of the next barrier point (6 in the figure) and stores (7) the value corresponding to the present barrier point to the synchronization flag (for example, FLAG#1) allocated to own processor (for example, CPU#1). The value corresponding to the barrier point which is calculated when each processor 1 has reached the equal barrier point is identical.

Next, the synchronization flag (FLAG#2) of another processor (for example, CPU#2) is read (8) and the value of the synchronization flag FLAG#2 is compared with the value of the synchronization flag FLAG#1 stored by the CPU. When these two values are equal, two CPU#1 and CPU#2 are determined to have reached the identical barrier point. Therefore, it can be said that the barrier synchronization between these two CPUs has been completed. Moreover, when the value of the synchronization flag #2 of the other CPU#2 is identical to the value stored in the synchronization flag under the condition that the own CPU#1 has reached the next barrier point, the barrier synchronization is determined to be completed (9). The reason will be described later.

In other cases (12), the synchronization flag of the another CPU is read (6) and similar comparison is repeated until the conditions are established.

When the condition (9) is established, it is checked whether the conditions of all CPU#1 to CPU#N which take part in the barrier synchronization are established or not (10). When the CPU which does not completed the check exists (14), the operation to read the synchronization flag is conducted from the next CPU (for example, CPU#3) (13). This operation is repeated until the conditions of all CPUs are established. When the conditions of all CPUs from CPU#2 to #N are established, the barrier synchronization is determined to be completed (11). Thereafter, the next process is started.

Even when the barrier synchronization is completed, values of synchronization flags of two CPUs are not identical in some cases. An example of FIG. 3 indicates that dead-lock is generated sometimes in the system where the barrier synchronization is determined to be completed only when the values of synchronization flags of two CPUs are identical.

Figure 3:
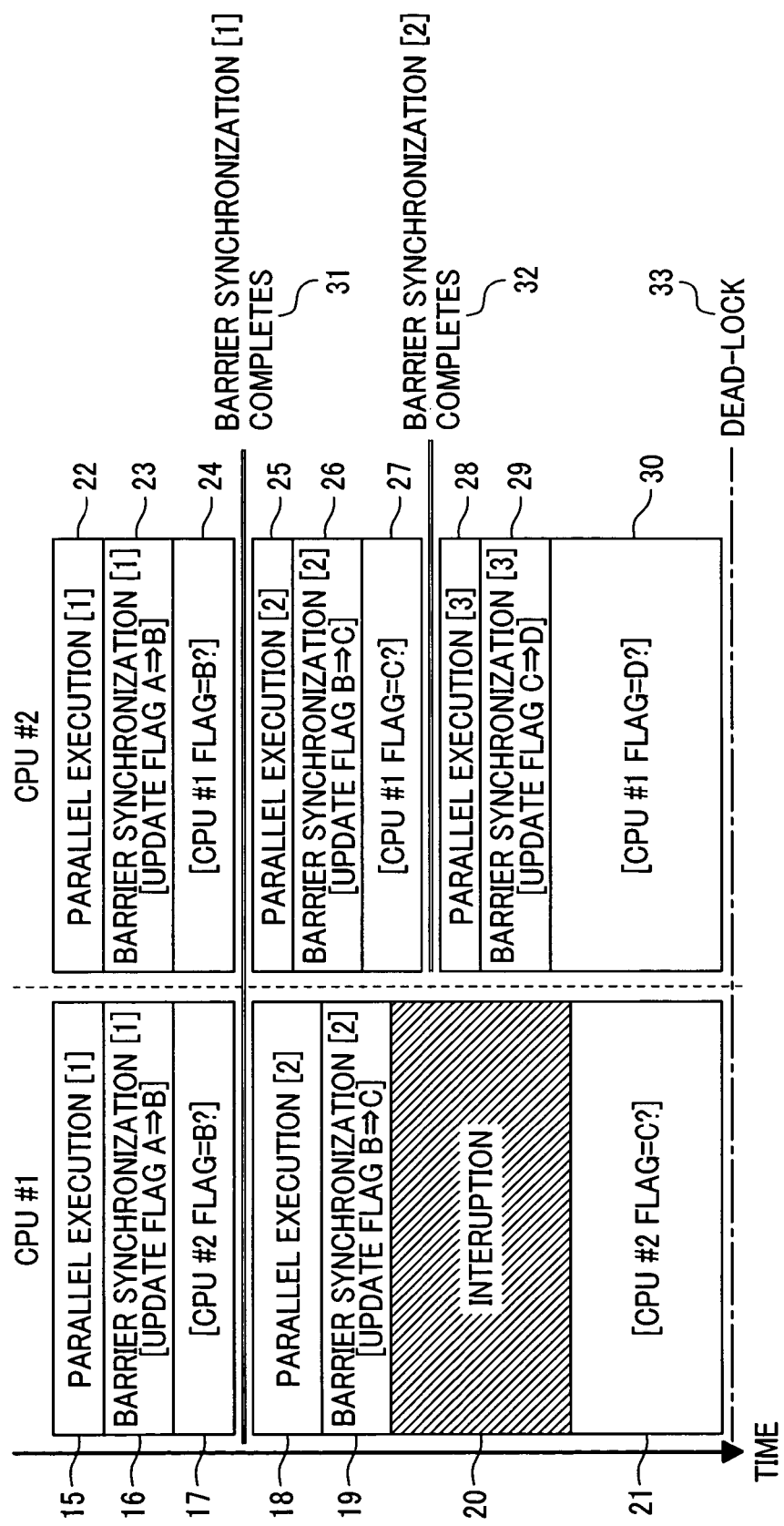
FIG. 3 is a time chart of an example of the barrier synchronization process by a couple of CPUs.

FIG. 3 is a schematic diagram where time is plotted on the vertical direction to indicate the progressing condition of processes in the time axis direction and conditions of synchronization flags when the two CPUs of CPU#1 and CPU#2 in the processor 1 take the barrier synchronization [1] and the barrier synchronization [2].

The CPU#1 starts, upon completion of the process in the parallel execution [1] (15 in the figure), the process of barrier synchronization [1] and updates the synchronization flag FLAG#1 of own CPU from A to B (16). Here, the CPU#2 as the partner of barrier synchronization checks whether the value of the same synchronization flag FLAG#2 is B or not (17).

Meanwhile, the CPU#2 also updates almost simultaneously, upon completion of the process in the parallel execution [1](22), the synchronization flag FLAG#2 of own CPU in the process of the barrier synchronization [1] from A to B (23), and comparison (24) of the synchronization flag FLAG#1 with the CPU# of the barrier synchronization partner.

In this case, the synchronization flags FLAG#1 and #2 are detected as B based on the check of the synchronization flag of the CPU#1 and CPU#2 (17, 24), the barrier synchronization [1] is completed (31).

Next, it is thought that the parallel execution [2] is executed in the CPU#1 and CPU#2 (18, 25) and the synchronization flags FLAG#1 and #2 of the respective CPUs are updated from B to C (19, 26) with the process of barrier synchronization [2].

When the CPU#1 enters the interruption process (20) in this timing, since the CPU#2 reads the synchronization flag of the CPU#1 as C, it is determined as identical to the synchronization flag FLAG#2 of own CPU (27), and the barrier synchronization [2] is completed (32). Accordingly, the CPU#2 executes the next parallel execution [3] of the barrier synchronization (28) to start the process of the next barrier synchronization [3]. Accordingly, the synchronization flag FLAG#2 of the CPU#2 is updated from C to D (29).

It is considered here that the CPU#1 recovers from the interruption process (20) and executes the process of the barrier synchronization [2] after the timing described above. In this case, the CPU#1 reads the synchronization flag of the CPU#2 to compare whether it is identical to the value C of the synchronization flag FLAG#1 of own CPU or not. However, since the synchronization flag FLAG#2 of the CPU#2 which has determined the completion of the barrier synchronization [2] is already updated to D with the process of the barrier synchronization [3], the CPU#1 cannot read the value C which is identical to the synchronization flag FLAG#1 of own CPU.

In this condition, since both CPUs #1 and #2 are waiting for the update of the values of synchronization flags (21, 30), it can be said that the dead-lock condition which will never be solved is appearing (33).

In order to avoid such dead-lock condition (33), it is enough for the comparison of the synchronization flags FLAG#1 and #2 that completion of barrier synchronization is judged to be completed even when the value of synchronization flag of the other CPU is identical to the value stored in the synchronization flag while own CPU reaches the next barrier point.

That is, in the comparison (21) with the synchronization flag FLAG#2 of the CPU#2 in the process of the barrier synchronization [2] of the CPU#1, the dead-lock condition (33) may be avoided by defining, as the completion of barrier synchronization, not only the condition that the value C of the present synchronization flag FLAG#1 of the CPU#1 is identical to the value of the synchronization flag FLAG#2 of the CPU#2 but also the condition that such value C is identical to the value D stored in the synchronization flag FLAG#1 when the CPU#1 has reached the next barrier point.

In the process (9) of FIG. 2, as described above, such dead-lock condition can be avoided by defining the completion of barrier synchronization when the value becomes identical to the value stored in the synchronization flag when the CPU has reached the next barrier point. Accordingly, the parallel process in the multiprocessor system (or parallel computer) can be advanced smoothly.

According to a profile of the present invention, even when the number of processors 1 which take part in the barrier synchronization becomes very large, the synchronization flag area 5 is acquired on the main memory 4. Therefore, necessary areas can be obtained, and various synchronization processes of various scales can be realized with a software without use of the particular hardware.

Therefore, high-speed barrier synchronization process can be realized, even during the parallel processes, among the processors which occupy the major part of the overhead and moreover high-speed parallel process of the multiprocessor system can also be realized by saving the paralleled overhead. In addition, the method based on the software has various advantages in cost and flexibility (measures for scale of parallel process and multiplex execution) because it is not required to provide the exclusive hardware.

Following two items are listed as the large factors for determining the performance of the parallel process (or parallel computer).

Parallel process may be realized easily (parallel process can be realized without change in the structure of existing programs).

Scalable performance may be realized during execution of the parallel process (performance may be obtained in accordance with the level of parallel process).

For realization of these factors, a high performance automatic parallel processing compiler is necessary and following points are very important for such complier.

Influence of overhead required for parallel process must be reduced.

Parallel execution must be increased as much as possible.

The parallel execution can be increased by introducing the parallel execution for smaller loop (including less amount of arithmetic portion). In order to suppress the influence of overhead for parallel process, the arithmetic portion of the parallel execution must be sufficiently larger than the overhead. Therefore, a measure for complete solution may be found in reduction of the overhead itself for parallel execution. The present invention relates to realization of reduction in overhead for parallel execution by conducting high-speed barrier synchronization process among the processors which occupy the major part of the overhead for parallel execution. In a certain method, the exclusive hardware is additionally provided, but the method introducing the software is preferential in the viewpoint of cost and flexibility (for scale of parallel execution and multiple execution).

Figure 4:
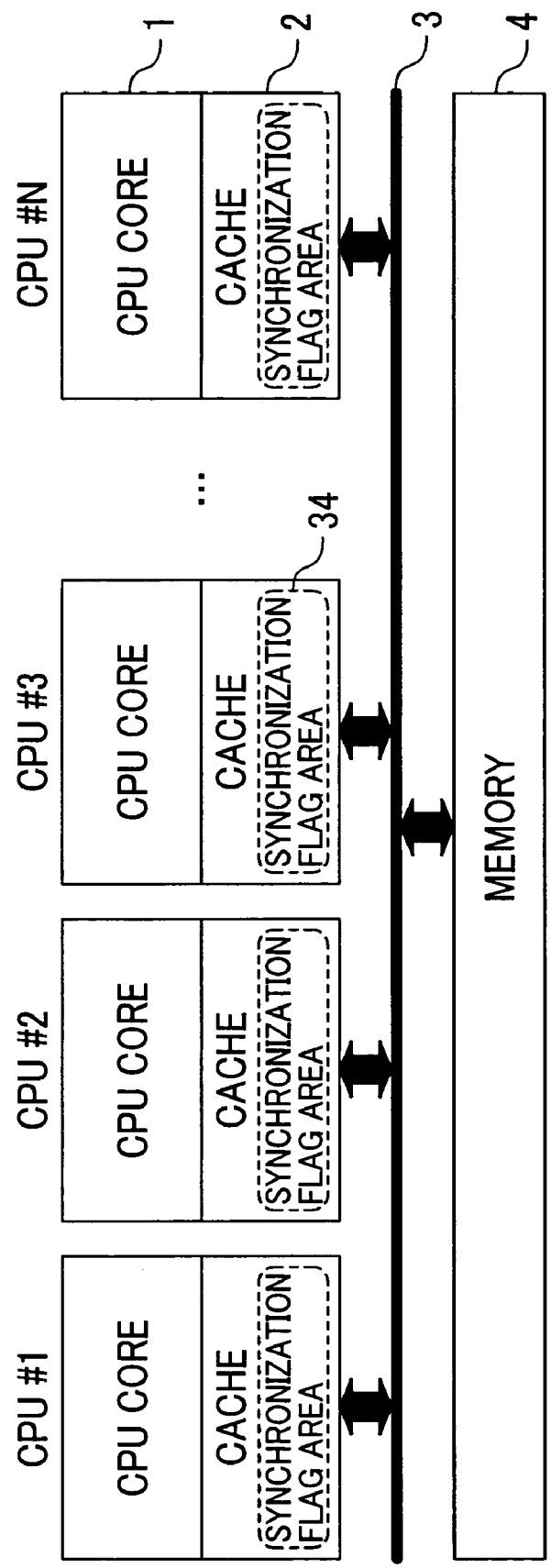
FIG. 4 is a structural diagram of a multiprocessor system for the barrier synchronization process as the second embodiment.

FIG. 4 illustrates the second embodiment in which the synchronization flag area 5 in the first embodiment is shifted to the area on the cache memory and the other structure is identical to the first embodiment.

The cache memory 2 of each CPU#1 to CPU#N forming a plurality of processors 1 is provided with a preset synchronization flag area 34 to store the synchronization flags FLAG#1 to #N. The cache memory for storing the synchronization flags FLAG#1 to #N may be acquired in the existing cache memory 2 or may be newly provided to store the synchronization flags #1 to #N.

Memory access latency of the processor 1 can be saved, high-speed write and read operations of the synchronization flags FLAG#1 to #N can be realized, and the processing time of the processing flow of FIG. 2 can be reduced by setting the synchronization flag area 34 to the cache memory 2 of the processor 1.

In this case, the synchronization flag area of own CPU may be stored through the mirroring for each cache memory 2 provided to each CPU#1 to #N. When it is requested that only the synchronization flag area of own CPU is stored and the synchronization flags of the other CPUs are read, it may also be read via the common bus 3.

The present invention is different from the barrier synchronization process using lock variables of the prior art in the point that the process flow illustrated in FIG. 2 is executed in parallel in each processor in the present invention, while the processes of a plurality of processors can be sequentially executed in the prior art because a plurality of processors take the lock variables through competition and only one processor enables the process simultaneously. Accordingly, the present invention can provide an advantage that increase in the processing time when the number of processors which take part in the barrier synchronization increases is rather less than that in the prior art.

Figure 5:
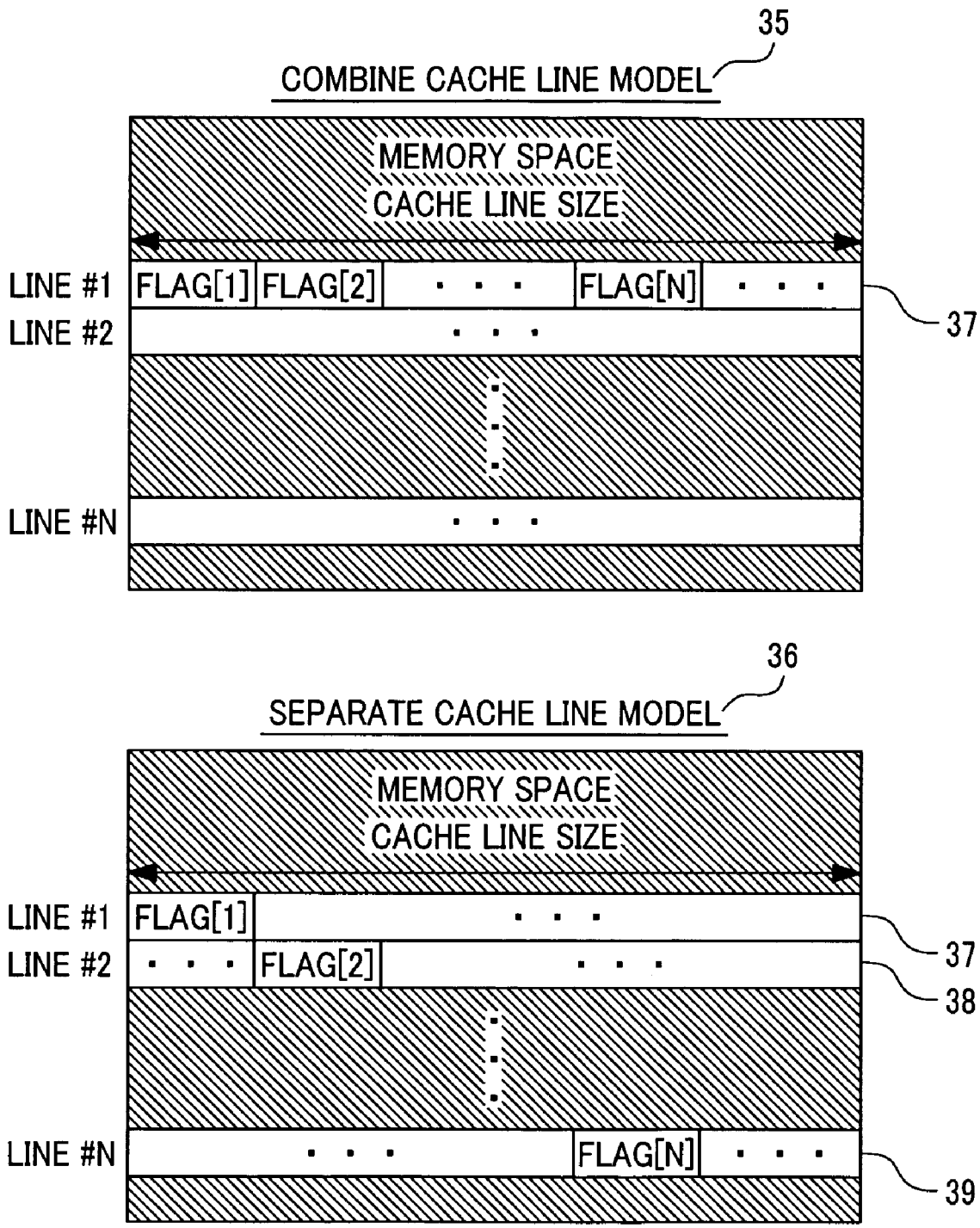
FIG. 5 is an explanatory diagram illustrating the mapping of the synchronization flag areas of the cache memory indicating a combined cache line model illustrated in the upper part and a separate cache line model illustrated in the lower part.

FIG. 5 schematically illustrates a couple of methods for acquiring the synchronization flag area 34 illustrated in FIG. 4 on the memory. In FIG. 5, the gray areas indicate the memory space of the synchronization flag area 34 and its lateral width indicates a cache line size. Here, one cache line means lateral one line.

In the combined cache line model (35 in the figure), the synchronization flags of the N processors are acquired for one cache line Line#1 (37). In FIG. 5, the N synchronization flags (flags [1] to [N] in the figure) are ensured in the continuous positions within the line#1 (37), but the sequence and place for the acquisition may be attained freely so long as the synchronization flags are not overlapped in the Line#1.

Meanwhile, in the separate cache line model (36 in the figure), only the synchronization flags of only one processor (flags [1] to [N] in the figure) are acquired in one cache line. Therefore, the synchronization flags FLAG#1 to #N of the N processors are acquired separately in the N cache lines Line#1 to #N (37 to 39).

In the respective cache lines, the positions for acquiring the synchronization flags are shifted for each cache line in the example of FIG. 5. Such position is selected at the desired position in the cache line, namely for example, all synchronization flag acquiring position is allocated at the top position of each cache line. Moreover, the N cache lines 37 to 39 are not always required to be the continuous areas on the memory space.

Figure 6:
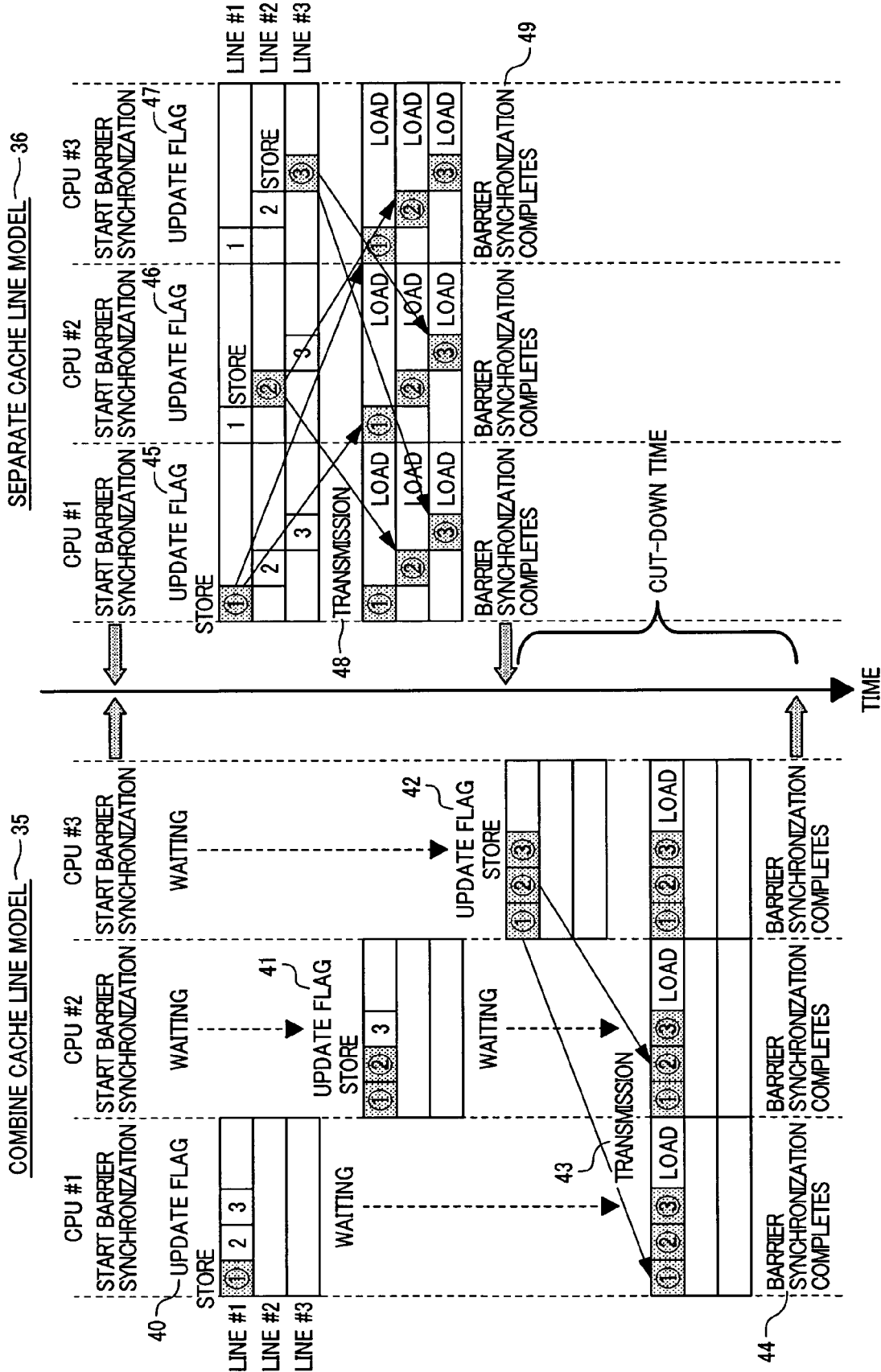
FIG. 6 is a time chart of the barrier synchronization process by three CPUs including the combined cache line model illustrated in the left half of the figure and the separate cache line model illustrated in the right half of the figure.

FIG. 6 is a schematic diagram illustrating an example of the processing sequence with the time axis plotted on the vertical direction in the case that the barrier synchronization process is executed with the system of the present invention among three CPUs of CPU#1, CPU#2, and CPU#3 as the processors 1.

Here, it is assumed that the three CPUs have started simultaneously the barrier synchronization processes with the combined cache line model (35 in the figure) or with the separate cache line model (36 in the figure).

In the combined cache line model (35), the CPU#1 updates first the synchronization flag 37 of the CPU#1 on the Line#1 (refer to FIG. 5). The CPU#2 and CPU#3 also try to simultaneously update the synchronization flag area of own CPU on the Line#1. However, the processes of the CPU#2 and CPU#3 are cancelled by the mechanism for maintaining the cache coherence among the CPUs because the CPU#1 has executed the storing operation to the Line#1 as the same cache line. The CPU#1 to #N are provided with the mechanism for maintaining coherence of the cache memory 2.

Next, the CPU#2 updates the synchronization flag area of own CPU on the Line#1. As described above, the CPU#3 also try to simultaneously update the synchronization flag area of own CPU on the Line#1, but it is cancelled again. Therefore, after completion of the update process of the CPU#2, the CPU#3 updates the synchronization flag area of own CPU on the Line#1. The processes up to this step correspond to the update processes (6, 7) of the synchronization flags in the process flow illustrated in FIG. 2.

Next, synchronization flag check processes (8 to 14) are respectively conducted with the CPU#1, CPU#2, and CPU#3. In this example, the CPU#3 determine the completion of barrier synchronization by comparing the values of the synchronization flags of the CPU#1 and CPU#2 with the synchronization flag of the CPU#3 because the Line#1 is already existing on the cache of own CPU.

Meanwhile, the CPU#1 and CPU# compare, after the update of flag, the value of the synchronization flag of own CPU with that of the other CPU. However, since the condition of completion of the barrier synchronization is not satisfied through the comparison of the synchronization flag until the CPU#3 updates the synchronization flag thereof and the updated Line#1 is transferred (43), the timing for completion of the barrier synchronization (44) is set almost at the same timing in which the CPU#3 has determined the completion of the barrier synchronization. Accordingly, in the combined cache line model (35), the synchronization flag can be updated only sequentially as a result, and the time required for barrier synchronization process increases almost in proportion to the number of processors which take part in the barrier synchronization.

Meanwhile, in the separate cache line model (36), since the synchronization flag areas of the CPUs to be updated by respective CPUs are allocated in the different cache lines Line#1 to #N, the CPU#1, CPU#2, and CPU#3 can almost simultaneously update own synchronization flags.

Next, in the check process of the synchronization flags FLAG#1 to #N, the cache line including the synchronization flags of the other CPU is transferred to the cache line of own CPU for the purpose of flash and then the comparison of the synchronization flag with that of such cache line is executed, whereby completion of the barrier synchronization is determined. Accordingly, since the parallel update of the synchronization flags may be realized among the CPUs in the separate cache line model (36), the time required for barrier synchronization process does not increase to a large extent even when the number of processors which taking part in the barrier synchronization increases. The number of times of transfer of the cache line increases but the processing time is prevented from increasing by increasing the number of the transfer lines in accordance with increase in the number of processors.

In the description about FIG. 6, the coherence control for each cache line is considered as the precondition but the parallel update of the synchronization flag area similar to that in the separate cache line model can be realized by acquiring, without relation to the cache line size, the synchronization flag area of each processor with one capacity per area of the size equal to or larger than the coherence control unit (cache line unit). That is, in the first embodiment, it is enough that an interval of the addresses on the memory of the memory area (synchronization flag area 5) individually assigned to each processor 1 is set equal to or larger than the processing unit (management unit) in the management for keeping the coherence for the cache memory 2 to be mounted to the processor 1.

Next, any problem does not occur in the barrier point when the identical value can be obtained when each processor reaches the same barrier point in regard to the value stored in the synchronization flag area. However, when a sequence 50 illustrated in FIG. 7, for example, is used, high-speed comparison process of the synchronization flags can be realized.

In the example of the sequence 50 indicating the execution count of barrier synchronization illustrated in FIG. 7, the execution count of barrier synchronization is assumed as M assuming the synchronization flag of 8 bits and it is also assumed the value of execution count up to the (Mmod8) power of 2 is written into the synchronization flag. Namely, this sequence requires the processes that the bits indicating 1 are shifted bit by bit to the left for each execution of the barrier synchronization in the synchronization flag of 8 bits under the condition that any one bit is always 1 and the other is always 0, and the next bit of the eighth bit is returned to the first bit. In other words, in this process, the bits indicating 1 rotate bit by bit to the left for each execution of the barrier synchronization.

As described above, the sequence 50 may be circulated because one or more difference is never generated in the execution count of the barrier synchronization of each processor when the barrier synchronization process is executed accurately. Namely, it is because the processor 1 having reached the next barrier point preceding the other processor 1 cannot execute the subsequent instructions (programs) until the other processor 1 reaches the same barrier point.

The reason why an example of the sequence 50 indicating the execution count of the barrier synchronization illustrated in FIG. 7 is suitable for the comparison process of the synchronization flags is as follows.

In the process flowchart of the barrier synchronization process illustrated in FIG. 2, the arithmetic process can be simplified and the process time can also be reduced because the comparison process with the synchronization flags of the other processors serves as the check whether the values are identical or the value is identical to that obtained by rotating the synchronization flag of own process for one bit in the left direction.

The sequence 50 includes at least the three values, namely, a value indicating that the present barrier synchronization process is being executed, a value indicating that the present barrier synchronization process has completed, and a value indicating that the next barrier synchronization process has completed. It is preferable for the sequence that it may be used through circulation. The more preferable sequence should be continued numerically and should be continued in the sequence of bit arrangement.

As described above, when a mechanism for maintaining coherence of the cache memory 2 of each CPU#1 to CPU#N is provided, high-speed process can be realized because it is enough that each cache line is flashed once for each synchronization without flash of cache of each processor for each update of the synchronization flag by using the cache memory 2 for the common memory and allocating the synchronization flags FLAG#1 to #N of one processor (CPU) for every cache line as the management unit of the cache coherence.

In the case where the parallel process is executed in the multiprocessor system, the overhead for parallel process can be reduced by realizing high-speed barrier synchronization process among the processors occupying the major part of the overhead for parallel process. Particularly, the method using the software has an advantage in the cost and flexibility (corresponding to scale of parallel process and multiple execution) without use of exclusive hardware.

As described above, the method for synchronization of processors in the multiprocessor system may be adapted to a multiprocessor for parallel process or a compiler for parallel process thereof.

What is claimed is:

1. A synchronizing method of multiprocessor system for barrier synchronization to execute parallel processes of program in a plurality of processors, comprising the steps of:
   providing, in said multiprocessor system, a shared memory area which is used in common by each processor;
   allocating individual memory areas for each processor in said shared memory area;
   providing, within said memory area, a counter for storing an execution count by each processor which has executed the process for a part to complete the barrier synchronization in said program; and
   executing subsequent programs to be executed by each processor after writing, with addition, the value of said counter of the individual memory area allocated to own processor when the part to complete the barrier synchronization in the program is executed and after determining that the identical value or more larger value is written to all memory areas allocated to the other processors.

2. A synchronization method of multiprocessor system for barrier synchronization to execute parallel processes of the program in a plurality of processors, comprising the steps of:
   providing, in said multiprocessor system, a shared memory area which is used in common by each processor;
   allocating individual memory area for each processor in said shared memory area;
   providing, in said memory area, a counter for storing a value corresponding to an execution count by each processor which has executed the process for a part to complete the barrier synchronization in the program;
   obtaining a value corresponding to the execution count from a sequence for determining a value corresponding to the execution count by each processor when the part to complete the barrier synchronization in the program is executed, and writing said value to the counter in the individual memory areas allocated to own processor; and
   executing subsequent programs after determining that the identical value is written into all memory areas allocated to the other processors or the value corresponding to the count obtained by adding 1 to said execution count is written in said sequence.

3. The synchronization method of multiprocessor system according to claim 1 or 2, wherein said processors comprise cache memories, and an interval of the addresses on the memory of memory area to be allocated individually to each processor is set equal to or larger than a processing unit in a management for maintaining coherence among the cache memories loaded to said processors.

4. The synchronization method of multiprocessor system according to claim 1 or 2, wherein said processors comprise cache memories and a mechanism for maintaining coherence among the cache memories, a cache memory for individual memory area to be allocated for each processor is set, and the barrier synchronization is performed utilizing said cache memory.

5. The synchronization method of multiprocessor system according to claim 2, wherein a sequence for determining a unique value in accordance with the execution count of the part to complete the barrier synchronization in said program repeats the identical sequence for a constant execution count.

6. The synchronization method of multiprocessor according to claim 5, wherein said sequence includes at least three values including a first value indicating that the previous barrier synchronization has been completed and the present barrier synchronization is being executed, a second value indicating that the present barrier synchronization has been completed, and a third value indicating that the next barrier synchronization has been completed.

* * * * *